Figure 1:
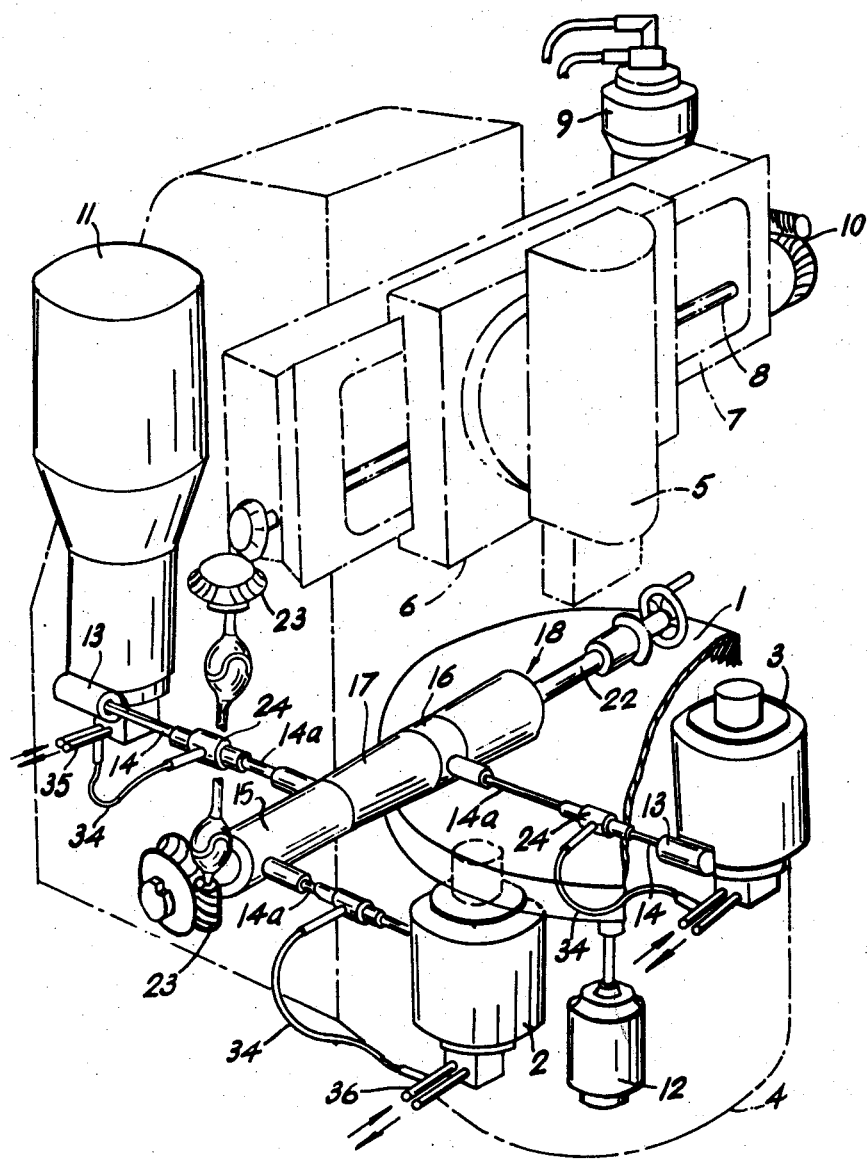

United States Patent Office 3,142,157
Patented July 28, 1964

3,142,157
POSITIVE DISPLACEMENT PRESSURE FLUID PUMPS AND MOTORS
Donald Firth and Roger Harvey Yorke Hancock, both of East Kilbride, Glasgow, Scotland, assignors to Council for Scientific and Industrial Research, London, England, a corporation of the United Kingdom
Filed Sept. 18, 1961, Ser. No. 138,749
Claims priority, application Great Britain Sept. 20, 1960
2 Claims. (Cl. 60—53)

This invention relates to positive displacement variable-stroke pressure fluid pumps and motors and to power transmission systems which incorporate them.

In all machines in which the output is derived from pressure fluid in a cylinder in which works a reciprocating piston, some leakage of pressure fluid inevitably takes place across the piston and at other points in the high pressure circuit such as ports and valves. This leakage varies with the nature of the fluid, the type of machine concerned, and the normal working range of pressure in the fluid line. The present invention is primarily, although not exclusively, concerned with hydraulic machines of the swash plate or ball piston type in which the stroke of the piston is adjustable in accordance with the required output of the machine.

Hitherto, the precision of the automatic control of the output of such machines in response to varying external demand has been limited by the changes in the rate of loss in the hydraulic circuit with changes in line pressure. It is an object of the present invention to provide control means for positive displacement variable-stroke pressure fluid machines in which compensation is effected for this variation in loss.

A variable stroke piston machine may be required to maintain a constant speed irrespective of load over a predetermined working range, or it may be required to maintain substantially constant power output irrespective of changes of speed within specified limits. In either case, automatic control of the stroke of the piston or pistons of the machine is provided, the normal control action being governed in accordance with the fluctuations in external demand. In a perfect leakage-free system, the output of the machine would then follow the changes in external demand with an accuracy governed solely by the accuracy of response of the control mechanism. The present invention provides for the superimposition on such a normal or predetermined control action of a further control action designed to compensate for changes in loss with changes in working pressure in the fluid line.

It is not essential that the normal control action of the variable-stroke machine be automatic. It can also be manual, and the present invention is equally applicable in such a case.

Preferably, the control mechanism for adjusting the piston stroke of the machine incorporates a force or motion compounding device having two input channels feeding a common output channel, one input being directly connected to the normal control system whilst the other input is operated by a pressure sensitive leakage compensating control element energized by the line pressure.

A force compounding device according to the present invention may take the form of an extensible or telescopic link including a cylinder and a coaxially adjustable piston exposed to fluid at line pressure, the fluid acting against a spring of a strength sufficient to transmit the normal control forces without significant deflection. Any deflection which does occur will be in the same sense as the compensating control action.

A motion compounding device may be constituted by an epicyclic gear having two of its elements connected respectively to the normal control input and to a pressure sensitive element operated by line pressure whilst the third element constitutes the common output for effecting the necessary changes in piston stroke.

A pressure fluid operated power transmission system using variable stroke piston machines may have a number of motors fed from a common pump. As the number of machines increases, the effect of variations in leakage losses per machine introduces a cumulative error in the normal control system, and it is an object of the present invention to provide means whereby the normal control mechanism for each machine may be compensated for the particular leakage loss characteristic of that machine. Thus, a standard common control system can be provided for effecting the normal control action proportional to external demand on the system as a whole whilst the present invention permits individual modification of the control action on each separate machine to compensate for individual losses.

Where the invention is incorporated in a swash plate machine, the control action effected by the pressure sensitive element may be applied to a mechanism for adjusting the angle of tilt of the swash plate. Such mechanism is described, for example, in the specification of application No. 111,724, filed May 22, 1961. When the invention is used in conjunction with an arrangement as shown in FIGURE 1 of the drawings accompanying the said co-pending application, the control action may be applied to the control valve 94 through a conventional motion compounding mechanism so that the external control force can be applied to the valve as required.

Another application of the invention is to ball pumps, and in this case the compensating control action can be combined, in a compounding mechanism, with the normal control motion of the rack 11 in the machine described and illustrated in the specification and drawings of co-pending patent application No. 39,538, filed June 29, 1960, now abandoned.

Figure 2:
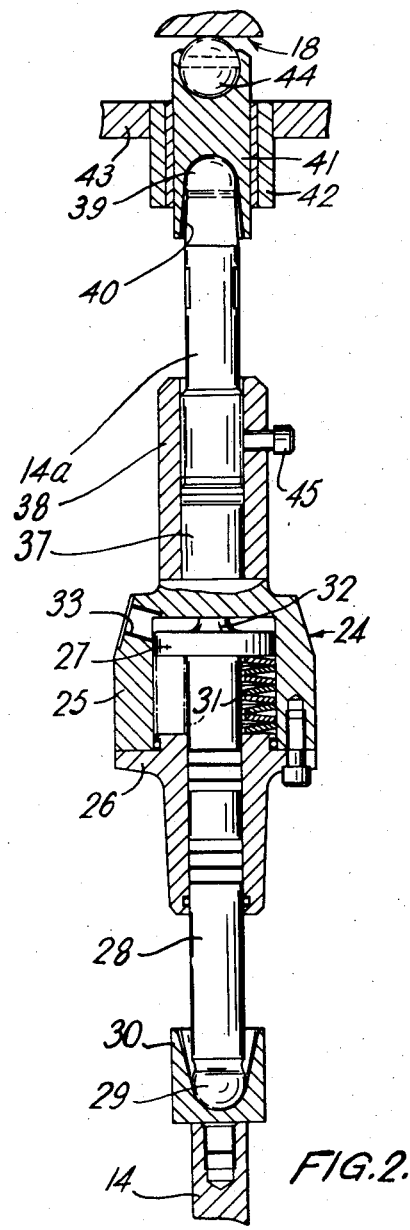

One practical embodiment of the present invention will now be described, by way of example only, with reference to the accompanying drawings in which:

FIGURE 1 is a schematic perspective view of an hydraulically operated vertical boring mill incorporating the present invention, and FIGURE 2 is a longitudinal section through a leakage-compensating pressure responsive element of FIGURE 1.

Referring first to FIGURE 1 of the drawings, a vertical boring mill has a horizontal rotary work table 1 driven directly by a pair of variable output hydraulic positive displacement motors 2, 3 mounted directly on the pedestal 4 of the machine. Above the table 1 is a horizontally travelling tool head 5 carried on a tool carriage 6 mounted on a transverse slide 7 and traversed by a lead screw 8. The lead screw is driven by a positive displacement hydraulic motor 9 through a reduction gear 10. A positive displacement pump 11 having variable output energises the table drive motors 2, 3 and a pump 12 driven from a gear on the table 1 energises the tool feed motor 9. In the specific arrangement shown, it is assumed that all the pumps and motors are of the ball piston type, and the motors 2, 3 and pump 11 each comprise a variable stroke reciprocating piston pressure fluid machine.

Each table drive motor 2, 3 and the pump 11 which supplies them are controlled, so as to give variable output, by individual rack and pinion mechanisms (indicated at 13) acting on the piston stroke adjustment member of the motor or pump. The racks are operated by push rods 14 which bear on the respective sections 15, 16, 17 of a composite variable-lift cam 18. The cam 18 is axially adjustable by means of a lead screw 22 and is rotated by a gear and shaft drive 23 from the tool carriage lead screw 8. Axial adjustment of the cam 18 by the screw 22 pre-sets the required constant cutting speed.

The action of the composite cam 18 and its attendant push rods 14 and control gear is to ensure the correctly phased increase of speed of the table with the inward traverse of the lead screw 8 so that constant cutting speed is maintained over the working range.

In such a machine, each or any push rod 14 incorporates a pressure sensitive element in the form of an extensible or telescopic link 24 which is automatically adjustable in length in dependence on the line pressure at corresponding motor 2 or 3, or pump 11. The link 24 thus constitutes a compounding mechanism which combines the normal control input from the cam 18 with a leakage compensating input from the pressure fluid line to produce a compensated output at the control mechanism 13 of the respective machine.

Referring now to FIGURE 2 of the drawings, each adjustable link 24 consists of a main body part constituted by a cylinder 25 and end cover 26. Within the cylinder 25 works a piston 27 mounted on a piston rod 28 which passes through the end cover 26 and terminates at its outer end in a hemispherical bearing knuckle 29. The piston 27 and cylinder 25 constitute the leakage compensating control input element. The knuckle 29 seats in a complementary cup 30 which is attached to the end of a shortened push rod 14, constituting the compensated control output element. Between the piston 27 and the end cover 26 is a spring 31—shown in FIGURE 2 as a series of dished washers—whilst on its outer face the piston is formed with a central boss 32. On this side of the piston, the cylinder 25 has a pressure inlet port 33 which is connected by a pipe 34 (FIGURE 1) to the pressure line 35 of the pump 11, or 36 of the motor 2 or 3, which is respectively associated with the particular push rod 14.

The cylinder 25 has a coaxial threaded spigot extension 37 on its outer end onto which is screwed a sleeve 38. This sleeve extends beyond the spigot 37 to form a socket for accommodating the end of a short push rod 14a terminating in a hemispherical end 39. The latter seats in a cup 40 on a tappet 41 which slides in a tappet guide 42 in a cam casing 43 which houses the multiple cam 18. The tappet 41 bears through a ball 44 on the appropriate portion of the cam 18. This assembly 14a ... 44 constitutes the normal control input channel for the associated machine.

In operation of the adjustable link 24, the piston 27 is normally held firmly in the datum position shown in FIGURE 2 by the spring 31, this position representing the minimum length of the link and being associated with the lower range of pump or motor operating pressures. As the working pressure in the pipes 35, 36 rises, however, leakage tends to increase, the piston is moved back against the spring 31 to extend the link 24 and superimpose an increment of adjustment of the swash plate or cam ring of the associated pump or motor to compensate for the increased leakage by increasing the stroke of the pump or motor pistons.

Fine adjustment of the minimum length of the link 24 is provided by a set screw 45 in the sleeve 38 which clamps the end of the push rod 14a in the desired position.

The arrangement described above with reference to FIGURE 2 of the drawings is a "series" linkage in which two input control actions, at 14a and 27 respectively, are superimposed colinearly. It will be understood, however, that these input control actions may be arranged on parallel axes, in which case the rods 14a, 28 would be articulated to opposite ends of a compensating link pivotally mounted between the articulation points on the compensated output element 14. The cylinder 25 in this arrangement would be fixed to the casing 43. The degree of leakage compensation by this modified arrangement would be adjustable, if desired, by making the fulcrum point about which the compensating link pivots on the rod 14 movable longitudinally of the link—e.g. by means of a pin and slot arrangement.

We claim:

1. In combination with a variable-stroke reciprocating piston pressure fluid machine having a pressure circuit, a controller comprising an output element connected to a stroke-control member of said machine, an input element responsive to external control signals, a cylinder carried by one of said elements, a pressure fluid connection to the cylinder from the pressure circuit of the machine, a piston reciprocable in the cylinder and carried by the other of said elements, the piston and cylinder having abutment surfaces which are interengageable to limit relative axial movement of the cylinder and piston in one direction and being relatively movable in the opposite direction by fluid pressure in the cylinder, and a spring between the piston and cylinder urging said abutment surfaces into engagement and yieldable proportionally to fluid pressure in the cylinder above a predetermined minimum value.

2. In combination with a variable-stroke reciprocating piston pressure fluid machine having a pressure circuit, a control link comprising a rod connected to a stroke-control member of said machine, an input rod responsive to external control signals, a cylinder carried by one of said rods, a pressure fluid connection to a working space in said cylinder from the pressure circuit of the machine, a piston reciprocable in the cylinder and carried by the other of said rods, said piston and cylinder having axially-opposed surfaces interengageable to limit movement of the rods towards each other and being relatively displaceable by pressure in said working space to move the rods away from each other, and a spring between the piston and cylinder urging said axially-opposed surfaces into engagement.

References Cited in the file of this patent

UNITED STATES PATENTS

| | | |
|---|---|---|
| 2,026,776 | Douglas | Jan. 7, 1936 |
| 2,934,380 | Julier et al. | Apr. 26, 1960 |